United States Patent
Holland et al.

(10) Patent No.: US 12,434,374 B2
(45) Date of Patent: Oct. 7, 2025

(54) WORK PART DELIVERY SYSTEM AND APPARATUS

(71) Applicant: TOYOTA MOTOR ENGINEERING & MANUFACTURING NORTH AMERICA, INC., Plano, TX (US)

(72) Inventors: Lloyd R. Holland, Georgetown, KY (US); Scottie L. Foster, Lawrenceburg, KY (US); Bradley J. Garcia, Louisville, KY (US); Michael C. Greenlee, Paris, KY (US); Jeffrey L. James, Mount Sterling, KY (US); Annetta L. Allen, Lexington, KY (US); Johnny O. Boarman, IV, Frankfort, KY (US); David A. Lajoice, Georgetown, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 17/970,107

(22) Filed: Oct. 20, 2022

(65) Prior Publication Data
US 2024/0131680 A1 Apr. 25, 2024
US 2024/0227154 A9 Jul. 11, 2024

(51) Int. Cl.
*B25H 1/10* (2006.01)

(52) U.S. Cl.
CPC .................................. *B25H 1/10* (2013.01)

(58) Field of Classification Search
CPC ...... B60P 1/02; B60P 1/04; B60P 1/16; B60P 1/4407; B62B 2203/10; B62B 3/08;
(Continued)

(56) References Cited

U.S. PATENT DOCUMENTS 7,891,631 B2 * 2/2011 Lee ..................... F16M 11/2021
248/676
9,463,967 B1 * 10/2016 Meyer ..................... B66F 9/065
(Continued)

FOREIGN PATENT DOCUMENTS

CN 203647602 U 6/2014
CN 213109366 U 5/2021
(Continued)

*Primary Examiner* — Robert F Neibaur
(74) *Attorney, Agent, or Firm* — SHEPPARD, MULLIN, RICHTER & HAMPTON LLP; Daniel N. Yannuzzi

(57) ABSTRACT

Systems and methods are provided for delivering a work part to an assembly line worker using a dolly assembly in a first configuration and retrieving the work part from the dolly assembly by the assembly line work while the dolly assembly is in a second configuration. According to some embodiments, a dolly assembly is provided comprising a base assembly having a support member and a mobility mechanism, the support member positioned obliquely with respect to a horizontal plane. The dolly assembly also includes a part-carrying member rotationally connected to the support member and having a part-holding structure for receiving a work part. The part-carrying member extends downward at an angle below the horizontal plane when in a first configuration, and extends upward from at an angle above the horizontal plane when in a second configuration.

20 Claims, 6 Drawing Sheets

(58) Field of Classification Search
CPC . B62B 1/12; B66F 7/0683; B66F 7/08; B25H 1/00
USPC ......... 254/122, 124, 2 R, 3 R, 3 B, 3 C, 9 C; 280/651; 248/133; 269/16
See application file for complete search history.

(56) References Cited

U.S. PATENT DOCUMENTS

| | | | |
|---|---|---|---|
| 10,457,184 B2 | 10/2019 | Hall, Jr. | |
| 10,906,157 B2* | 2/2021 | Olberg | B25H 1/10 |
| 10,968,086 B1* | 4/2021 | Tennant | B66F 7/26 |
| 2022/0226176 A1* | 7/2022 | Christensen | A61G 5/1059 |

FOREIGN PATENT DOCUMENTS

| | | | |
|---|---|---|---|
| DE | 4114011 A1 | 11/1992 | |
| DE | 4238733 A1 | 5/1994 | |

\* cited by examiner

WORK PART DELIVERY SYSTEM AND APPARATUS

TECHNICAL FIELD

The present disclosure relates generally to devices for delivering work parts to assembly line workers, and in particular, some implementations relate to dolly assemblies having a first configuration to receive a work part for delivery to an assembly line worker and a second configuration from which the assembly line worker can retrieve the work part.

DESCRIPTION OF RELATED ART

In vehicle assembly line manufacturing processes, work parts are often loaded by conveyance delivery team members onto a dolly, which is delivered to an assembly lineside team member. Lineside team members are generally on a lifted platform that is approximately 3 feet above a manufacturing floor on which the dolly is positioned. Existing dollies are generally set at a low height so that the conveyance delivery team member can load the dolly with the work parts. As a result, lineside team members are forced to bend down to retrieve work parts from the dolly and lift the work part for installation, which is neither efficient nor ergonomic. Furthermore, work parts are generally loaded upside down, which results in deformation to the work parts and causes audit defects. Additionally, by loading the work parts upside down, it can be difficult for lineside team members to lift the work parts from the dolly.

BRIEF SUMMARY OF THE DISCLOSURE

According to various embodiments of the disclosed technology, dolly assemblies having a first configuration to receive a work part for delivery to an assembly line worker and a second configuration from which an assembly line worker can retrieve the work part are provided herein.

In accordance with some embodiments, a dolly assembly is provided. The dolly assembly comprises a base assembly comprising a support member and a mobility mechanism, the support member positioned obliquely with respect to a horizontal plane. The dolly assembly also comprises a part-carrying member rotationally connected to a first end of the support member. The part-carrying member comprises a part-holding structure for receiving a work part. The part-carrying member extends downward from the first end of the support member at an angle below the horizontal plane when in a first configuration, and the part-carrying member extends upward from the first end of the support member at an angle above the horizontal plane when in a second configuration.

In another aspect, a work part cart is provided. The work part cart comprises a base assembly having a first surface opposite a second surface along a longitudinal plane of the work part cart and a first side opposite a second side along a transverse plane of the work part cart. The base assembly comprises a support member at the first surface and positioned obliquely with respect to the transverse plane of the work part cart. The support member comprises a first end proximate to the first side of the base assembly and a second end proximate to the second side of the base assembly. The base assembly also comprises a mobility mechanism coupled to the second surface. The work part cart also comprises a rotation mechanism disposed on the first surface of the base assembly at the first end of the support member, where the rotation mechanism comprises a rotational axis approximately parallel to the transverse plane. The work part cart further comprises a part staging assembly adjacent to the first surface of the base assembly opposite the second surface, where the part staging assembly has a first surface opposite a second surface along the longitudinal plane of the work part cart. The part staging assembly comprises a part-carrying member disposed on the first surface of the part staging assembly, where the part-carrying member has a first end and a second end and the rotation mechanism is connected proximate to the first end of the part-carrying member. The part staging assembly also comprises a part-holding structure configured to receive a work part, the part-carrying assembly disposed on the part-carrying member and extending toward the second surface of the part staging assembly.

In another aspect, a work part delivery apparatus is provided. The work part delivery apparatus comprises a first assembly comprising a mobility mechanism, and a second assembly supported by the first assembly and configured to receive one or more work parts on a support structure extending away from the first assembly. The second assembly is also configured to rotate relative to the first assembly about a pivot point located between the first and second assemblies. The second assembly comprises a first configuration in which the support structure extends away from the pivot point and a second configuration in which the support structure extends toward the pivot point.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments disclosed herein can provide for work part delivery systems and apparatus, and more particularly, a dolly assembly comprising a part staging assembly connected to a moveable base assembly via a rotation mechanism. The moveable base assembly includes a support member that is positioned at an oblique angle with respect to a transverse plane (e.g., a horizontal plane). The rotation mechanism provides for a rotational movement of the part staging assembly by which the part staging assembly is convertible between multiple configurations. For example, the part staging assembly can be placed into a first configuration by rotating the part staging assembly downward to a loading position at an angle below the transverse plane. While in the first configuration, work parts can be loaded on the dolly assembly. Particularly, conveyance delivery team members can load work parts onto a part-holding structure, of the part staging assembly, which is adapted to receive work parts (e.g., a vehicle part, such as a fender liner, fender body panel, and the like). The part staging assembly can then be placed into a second configuration by rotating the part staging assembly upward to a pick-up position at an angle above the horizontal plane. While in the second configuration, work parts can be retrieved by lineside team members for installation.

Figure 4:
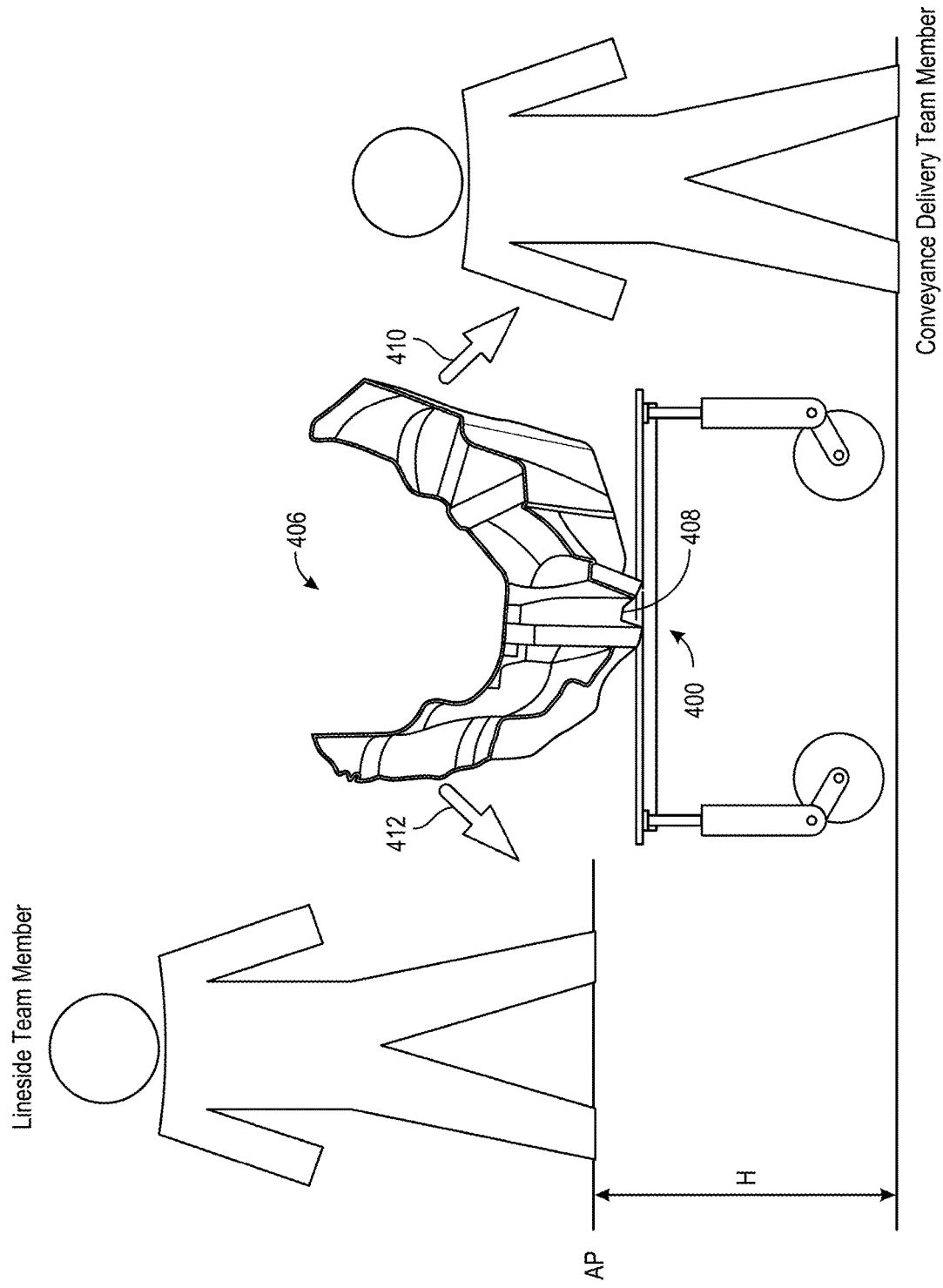
FIG. 4 depicts a conventional dolly utilized in delivering work parts to an assembly lineside team member.

Accordingly, embodiments disclosed herein overcome several technical shortcomings of conventional work part delivery systems. For example, as described above, conventional dollies utilized to deliver work parts during vehicle manufacturing process force lineside team members to bend down to retrieve work parts from a delivery dolly, resulting in poor workplace ergonomics for the lineside team members and may cause strain, increases instances of back problems, etc. For example, FIG. 4 depicts a conventional dolly 400 utilized to deliver work parts to a lineside team member on a lifted assembly platform AP at a height (H) above a manufacturing floor MF. The lineside team member typically reached down, potentially below the height of the assembly platform, to retrieve work parts 406. The embodiments disclosed herein eliminate the ergonomic impact on the lineside team member by permitting work parts to be lifted up, in the second configuration, to a height that removes the necessity of bending over to pick up a work part.

Further, embodiments disclosed herein can avoid introducing ergonomic impacts on the conveyance delivery team members through utilization of the first configuration. For example, as described above, conventional dollies include a low height (as shown in FIG. 4) so that conveyance delivery team members can load work parts onto a dolly. If the height of conventional dollies are increased so as to reduce ergonomic impacts on the lineside team members, this change can result in introducing other/additional ergonomic impacts on the conveyance delivery team members due to having to lift work parts to a higher height to place the work parts on the higher dolly. Accordingly, the embodiments disclosed herein provide for at least the first and second configurations, which provide for an adjustable height of the parts staging assembly so that ergonomic impacts on both the conveyance delivery team member and the lineside team member are reduced (or eliminated).

Another technical shortcoming of the conventional dollies is that work parts tend to be loaded in an upside down orientation. As alluded to above, loading work parts upside down can result in deformation of the work parts. For example, in the case of fender liners, which may have a generally partial-torus shape and a partial-circular profile, as multiple fender liners are stacked upside down (e.g., apex of the fender liner placed on the dolly such that ends stand upright) and one on top of the other, gravitational forces pull down on the ends of the fender liner causing the radius of the fender liners to increase due to bending. FIG. 4 illustrates an example where work part 406 are fender liners and arrows 410 and 412 depict illustrative directions of deformation. Furthermore, work parts loaded in an upside down orientation can be increasingly difficult to retrieve from the dolly by the lineside team members. For example, again referring to the fender liner example where a curvature apex of the fender liner (e.g., apex 408 shown in FIG. 4) are placed on the dolly, the lineside team member must reach down into the torus shape and pick up the fender liner, turn the fender liner into proper orientation (e.g., turn it right side up), and install on the process, all while avoiding contact with nearby surroundings or the team member's body, which may result in injury and/or further damage to the fender liner.

Accordingly, embodiments disclosed herein provide for a part-carrying assembly having a part-holding structure adapted to receive work parts in the upright orientation. The part-holding structure, according to various embodiments disclosed herein, may comprises a part holding member shaped to receive the work part in the right side up orientation. The part-holding member may apply supportive forces along the length of the work parts to reduce (or eliminate bending). For example, referring once again to the fender liner example, the part-holding member may be shaped to coincide with the shape of the fender liner. That is, the part-holding member may have a generally partial-torus shape and a partial-circular profile having a radius that matches an inner surface of the fender line. Thus, when the fender liner is received by the part-holding member, the inner surface of the fender liner contacts the part-holding member, which supplies supportive forces to maintain the shape of the fender liner. Furthermore, the part-holding member is positioned such that the apex of extends upward, away from dolly assembly, which results in the fender liners being stacked in the upright position (e.g., apex toward the lineside team member).

Figure 1A:
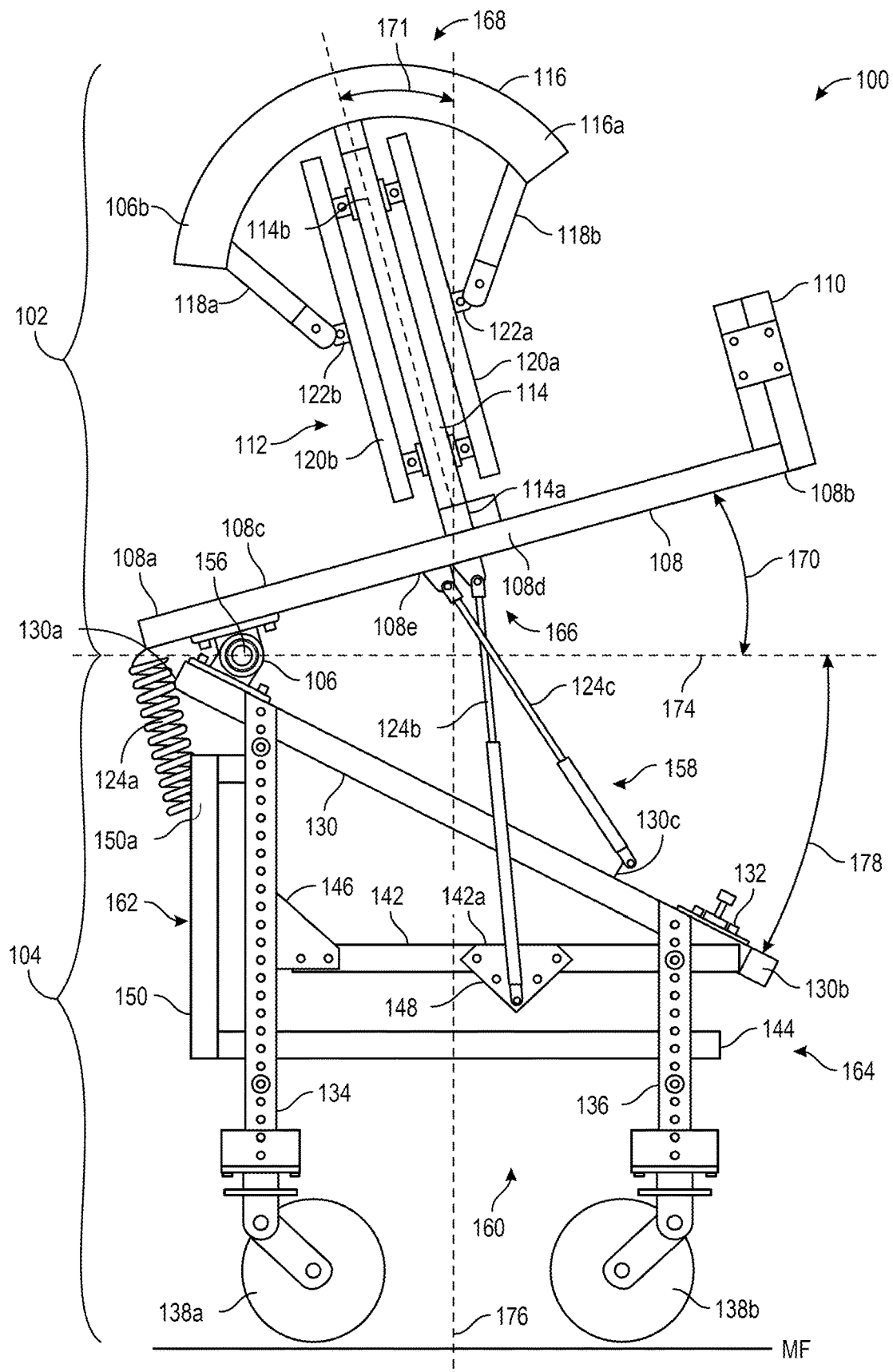
FIGS. 1A and 1B depict schematic side views of an example dolly assembly in accordance with embodiments described herein.
Figure 1B:
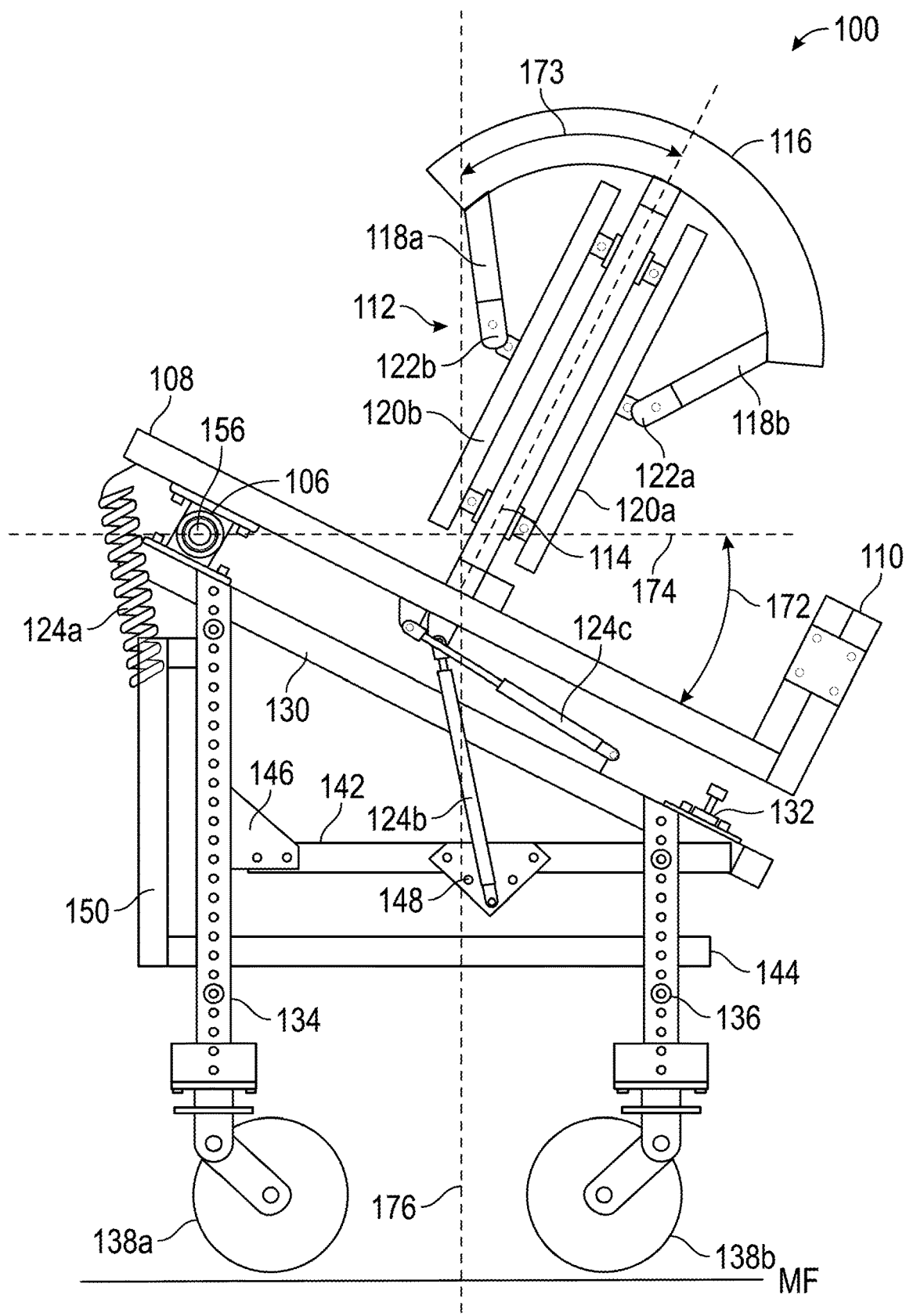

FIGS. 1A and 1B depict schematic side views of an example dolly assembly 100 (also referred to as a work part cart or work part delivery apparatus) in accordance with embodiments described herein. FIG. 1A depicts the dolly assembly in a second configuration from which a work part can be loaded onto the dolly assembly 100 and FIG. 1B depicts the dolly assembly in a first configuration from which a work part can be retrieved from the dolly assembly 100. The dolly assembly 100 can be utilized, for example, in delivering work parts to an assembly lineside team member on a manufacturing floor (MF). The dolly assembly 100 has a moveable base assembly 104 (sometimes referred herein as a first assembly) and a part staging assembly 102 (sometimes referred herein as a second assembly) rotationally connected to the moveable base assembly 104 via a rotation mechanism 106 having a rotational axis 156 passing therethrough. The part staging assembly 102 can rotate about the rotational axis 156 between a loading position (e.g., first configuration shown in FIG. 1B) and a pick-up position (e.g., second configuration shown in FIG. 1A), and vice versa. The moveable base assembly 104 and part staging assembly 102 may be constructed from a material such as, but not limited to, steel, iron, aluminum, wood, plastic, polymers and the like. The moveable base assembly 104 and/or part staging assembly 102 may be assembled in any suitable shape and/or size dimensions for a particular application. In the non-limiting embodiment shown in FIGS. 1A and 1B, the moveable base assembly 104 and part staging assembly 102 is constructed from squared steel tubing.

The moveable base assembly 104 includes a first surface 158 (e.g., a top surface) opposite a second surface 160 (e.g., a bottom surface) along a longitudinal plane 176 (e.g., a vertical plane). The moveable base assembly 104 also has a first side 162 opposite a second side 164 along a transverse plane 174 (e.g., a horizontal plane). The moveable base assembly 104 comprises a support member 130 forming the first surface 158 and positioned obliquely with respect to the transverse plane 174. The support member 130 has a first end 130a proximate to the first side 162 of the moveable base assembly 104 and a second end 130b proximate to the second side 164 of the moveable base assembly. The support member 130 extends from the first end 130a downward to the second end 130b at an angle 178 from the transverse plane 174. Angle 178 may be any angle from transverse plane 174, for example, angle 178 may be between 10° and 80° from transverse plane 174. In some embodiments, angle 178 may be between 20° and 40, and, in another example, angle 178 is between 25° and 35°.

As used herein, the term "proximate" refers to a part, body, element, member, etc. being in physically close relationship to another part, body, element, member, etc. More particularly, proximate is used herein to indicate a first part, body, element, member, etc. is closer to second part, body, element, member, etc. than a third part, body, element, member, etc. For example, in the above case, the first end 130a is proximate to the first side 162 or, said another way, the first end 130a is closer in physical relation to the first side 162 than the second side 164.

The support member 130 is supported by leg members 134 and 136. Leg member 134 is connected to the support member 130 between the first end 130a and the second end 130b, proximate to the first end 130a (e.g., closer to the first end 130a than the second end 130b). Leg member 136 is connected to support member 130 between the first and second ends 130a and 130b, proximate to the second end 130b. Cross beams 144 and 142 extend between the first side 162 and the second side 164 and are connected to the leg members 134 and 136. In some examples, cross beams 144 and 142 can be affixed to leg members 134 and 136 via fasteners. Example fasteners include, but are not limited to, bolts, nuts, and washers; anchors; rivets; screws, and the like. In another example, the cross beams 144 and 142 can be affixed to leg members via brackets, such as bracket 146.

The moveable base assembly 104 also includes a mobility mechanism 138, for example, in the form of wheels 138a and 138b coupled to the second surface 160. The mobility mechanism 138 permits a conveyance delivery team member to move the dolly assembly 100 as desired on the manufacturing floor MF. In the illustrative example shown in FIGS. 1A and 1B, wheels 138a and 138b are affixed to leg members 134 and 136, respectively. However, wheels 138a and 138b may be affixed to any surface of the moveable base assembly.

As alluded to above, the dolly assembly 100 also includes part staging assembly 102 rotationally connected to the moveable base assembly 104 by rotation mechanism 106. Rotation mechanism 106 can be provided as a hinge, for example, a pivot hinge, butt hinge, concealed hinge, ball bearing hinge, and the like. In an illustrative example, rotation mechanism 106 is a pillow block bearing using a 20 mm rod, selected to handle the weight of part staging assembly 102 and work parts carried thereon. The rotation mechanism 106 may include a rotational axis 156 extending approximately parallel to the transverse plane 174, which may function as a pivot point. The rotation mechanism 106 may be connected to the support member 130 proximate to the first end 130a. For example, the rotation mechanism 106 may be affixed to the support member 130 (e.g., via fasteners or the like) between the leg member 134 and the first end 130a. In some examples, the rotation mechanism 106 may be positioned as close to the first end 130a as possible.

The part staging assembly 102 can be positioned adjacent to the first surface 158 opposite the second surface 160, for example, above the support member 130. The part staging assembly 102 has a first surface 166 opposite a second surface 168 along the longitudinal plane 176. The part staging assembly 102 comprises a part-carrying member 108 forming the first surface 166 and a part-holding structure 112 positioned on the part-carrying member 108.

The part-carrying member has a first end 108a and a second end 108b. The rotation mechanism 106 is connected proximate to the first end 108a of the part-carrying member 108 at a position 108c. Thus, the first end 108a is proximate to the first end 130a of the support member 130. As shown in FIGS. 1A and 1B, a portion of the part-carrying member 108 extends between position 108c to the first end 108a and overhangs relative to the first end 130a of the support member 130.

The part-holding structure 112 is connected to the part-carrying member 108 between the position 108c and the second end 108b at position 108d. The part-holding structure 112 extends in a direction toward the second surface 168. The part-holding structure 112 comprises: a center support member 114 having a first end 114a connected to the part-carrying member 108 at position 108d and a second end 114b, and a part-holding member 116 connected to the second end 114b of the part-carrying member 108. The part-holding member 116 comprises a shape that is according to the work part to be received. That is, the shape of part-holding member 116 may be formed so as to provide a uniformly supportive force to work parts stacked upon the part-holding member 116. Due in part to the shape of part-holding member 116, deforming of the work parts stacked thereon can be reduced. In various embodiments, the part-holding member 116 can include a pressuring absorbing material or padding adapted to flex and absorb pressure exerted on the part-holding member 116 by the weight of work parts placed thereon, which may provide additional means for reducing deformation of and/or damage to work parts. Any type of pressure absorbing material may be used as long as the selected pressure absorbing material holds it shape and does not damage the work product placed thereon. Example pressuring absorbing materials may include, but not limited to, foam padding, rubber padding, etc. In some examples, a two-pound form is selected as the pressure absorbing material. In another example, a 3D printed shape padding may be used. The part-holding member 116 may include a pressure absorbing padded top layer supported by another material, or may be formed fully of an absorptive padding material.

In some embodiments (as shown in the illustrative example of FIGS. 1A and 1B), the part-holding structure 112 may also include optional end support members 118a and 118b. End support members 118a and 118b extend from the center support member 114 to ends 116a and 116b of the part-holding member 116, respectively, forming respective angles with the center support member 114. The end support members 118a and 118b can function to provide additional support at the ends of work parts received at ends 116a and 116b. Through the additional support provided by end support members 118a and 118b, deformation of work parts can be further reduced and/or eliminated entirely since the work parts will be uniformly supported along the length of the work part body. According to some examples, the respective angles formed between end support members 118a and 118b and the center support member 114 may be adjustable. For example, end support members 118a and 118b include a coaster system that comprises bearings 122a and 122b (or guide rollers or the like) attached to ends of end support members 118a and 118b, respectively. The bearings 122a and 122b may ride within grooved bars 120a and 120b disposed on opposing sides of the center support member 114. The grooved bars 120a and 120b comprise channels (not shown in FIGS. 1A and 1B) extending along the length thereof, which permit the bearings 122a and 122b to travel within. Thus, as the bearings 122a and 122b travel along respective channels, the angle formed between end support members 118a and 118b can be adjusted. As a result, ends 116a and 116b can be raised and/or lowered, relative to the second end 114b of the support member 114, as desired for a particular work part, so to ensure uniform support can be applied to the work part.

The dolly assembly 100 can also include lift and tilt mechanisms 124 configured to adjust the elevation and angular position the part staging assembly 102. Lift and tilt mechanisms may be used to apply forces to the part-carrying member 108, which cause the part-carrying member 108 to rotate about the rotational axis 156. The lift and title mechanisms 124 can include a plurality of lift and tilt mechanism, illustratively shown in FIGS. 1A and 1B as first lift and tilt mechanism 124a, second lift and tilt mechanism 124b, and third lift and tilt mechanism 124c (collectively referred to as lift and tilt mechanisms 124). The first lift and tilt mechanism 124a, illustratively provided as a spring, can be connected between the first end 108a of the part-carrying member 108 and the first side 162 of the moveable base assembly 104. For example, the first lift and tilt mechanism 124a can be connected to a position 150a of first support beam 150, which is connected to leg member 134 (and/or cross beam 144).

In the first configuration shown in FIG. 1B, the first lift and tilt mechanism 124a, provided as a spring, can be in a stretched state and storing potential energy as a result of the stretched state. At this point, the part-carrying member 108 extends downward from the first end 108a at an angle 172 with respect to the transverse plane 174, and the second end 108b is at a lower height than the first end 108a from the manufacturing floor MF. In some embodiments, angle 172 may be approximately the same as angle 178 such that, in the first configuration, part-carrying member 108 extends in a direction approximately parallel with support member 130. In another example, angle 172 may be between 5° and an angle selected such that part-carrying member 108 contacts stopper 132 and does not contact support member 130. For example, in some embodiments, angle 172 may larger than angle 178 by 20° or less. Furthermore, the central support member 114 extends in a direction away from the rotation mechanism 106 at an angel 173 from the longitudinal plane 176. When the dolly assembly 100 is operated to change to the second configuration, the lift and tilt mechanism 124a exerts a restoring force on lift and tilt mechanism 124a at the first end 108a of the part-carrying member 108. The restoring force is converted to a torque exerted on first end 108a causing the part-carrying member 108 to rotate in a counter clock-wise direction about rotational axis 156, thereby changing the elevation of the second end 108b and angle of part-carrying member 108 with respect to the transverse plane 174. Thus, in the second configuration as shown in FIG. 1B, the part-carrying member 108 extends upward from the first end 108a at an angle 170 with respect to the transverse plane 174, and the second end 108b is at a higher elevation than the first end 108a from the manufacturing floor MF. Angle 170 may be any angle from transverse plane 174, for example, angle 170 may be between 10° and 80° from transverse plane 174. In some embodiments, angle 170 may be between 20° and 60, and, in another example, angle 170 is between 30° and 50°. Furthermore, the central support member 114 extends in a direction toward the rotation mechanism 106 at an angel 171 from the longitudinal plane 176. In some embodiments, where lift and tilt mechanism 124a is a spring, the spring may be in a partially stretched state in the first configuration, thereby exerting a torque at first end 108a that is less than the torque while in the second configuration.

Second and third lift and tilt mechanisms 124b and 124c can be cylinders connected to an underside of the part-carrying member 108 at position 108e (e.g., underside of the part-carrying member 108 opposite of the part-carrying structure 112) and to the moveable base assembly 104. FIGS. 1A and 1B illustrate an example arrangement of lift and tilt mechanisms 124b and 124c, where lift and tilt mechanism 124b is rotatably connected to part-carrying member 108 and cross beam 142 at position 142a via bracket 148, and lift and tilt mechanism 124c is rotatably connected to part-carrying member 108 and the first surface 158 on the support member 130 at position 130c. Rotatably connected herein refers to affixing of ends of the lift and tilt mechanisms via fasteners that can be rotated (e.g., via ball and socket joints, ball bearings or the like). The lift and tilt mechanisms 124b and 124c as cylinders are extendable in length and may be hydraulic, electrical, or pneumatic powered. In various embodiments, the tilt mechanisms 124b and 124c are provided as pneumatic struts. The tilt mechanisms 124b and 124c may be movable between a first orientation to position the part-carrying member 108 in the first configuration of FIG. 1B and a second orientation to assist in pivoting the part-carrying member 108 about the rotational axis 156 as illustrated in FIG. 1A. In the first orientation (e.g., first configuration shown in FIG. 1B), lift and tilt mechanisms 124b and 124c may function to hold part-carrying member 108 in the first orientation. In some embodiments, a locking mechanism (e.g., a hook and latch, catch and latch, and the like) may be provided on part-carrying member 108 (e.g., at second end 108b) to hold part-carrying member 108 in the second orientation. In the second orientation (e.g., elongated orientation), the lift and tilt mechanisms 124b and 124c apply a force in a direction along their respective lengths to the part-carrying member 108, which operates to hold the part staging assembly 102 in the second configuration. During transition from the first to the second configuration, the lift and tilt mechanism 124b and 124c can operate to apply assistive forces, in the direction along their respective lengths, to assist a conveyance delivery team member with pivoting the part-carrying member 108 about the rotational axis 156.

While three lift and tilt mechanisms are illustrated in FIGS. 1A and 1B, embodiments disclosed herein are not so limited and more or fewer mechanism may be utilized as desired. Furthermore, while FIGS. 1A and 1B show the lift and tilt mechanisms connected to certain locations/positions on the part staging assembly and moveable base assembly, other attachment points are possible to provide sufficient torque and/or forces to lift and title the part staging assembly. For example, the positioning of lift and tilt mechanism 124b and 124c may be adjusted to provide sufficient assistive forces so to lift part staging assembly 102. Similarly, the lift and tilt mechanism 124a may be attached to alternative locations of the moveable base assembly as desired.

The part staging assembly may also include a handle 110 connected at the second end 108b and extending in a direction toward the second surface 168 of the part-carrying member 108. The handle 110 may be provided as a pair of horizontally situated handlebars, a single lever/bar extending from the part carrying member 108 away from the dolly assembly 100, or other handle types. The handle 110 can be provided as a lifting or pulling point for the conveyance delivery team member for converting the dolly assembly 100 between the first and second configurations. For example, the conveyance delivery team member may operate handle 110 while dolly assembly 100 is in the first configuration (FIG. 1B) by lifting on handle 110. Lifting handle 110 results in the second end 108b of the part-carrying member 108 to change elevation toward the second surface 168. As described above, the lift and tilt mechanisms 124 then assist the conveyance delivery team member by applying torque and forces to cause the angular orientation of the part staging assembly to change via rotation about rotational axis 156. Conversely, while dolly assembly 100 is in the second configuration (FIG. 1A), conveyance delivery team member may operate handle 110 by pulling down on handle 110. Pulling down handle 110 results in the second end 108b of the part-carrying member 108 to change elevation toward the manufacturing floor MF. The lift and tilt mechanism 124a, provided as a spring, stretches while lift and tilt mechanism 124b and 124c applies resistive forces that provides for a smooth return to downward position.

In some embodiments, a stopper 132 may be provided proximate to the send end 130b of the support member. In the second configuration, the part-carrying member 108 may contact the stopper 132 to hold and/or maintain the part-carrying member 108 at a desired and steady position for transit on the manufacturing floor MF. In some embodiments, the stopper 132 may be provided as a shock absorbing device designed to absorb and/or dampen shock impulses when to second end 108b of part-carrying member 108 is lowered into the second configuration. In another example, stopper 132 may be comprise pressure absorbing material, for example, a rubber or foam padding on which the second end 108b may rest during transit.

Figure 2:
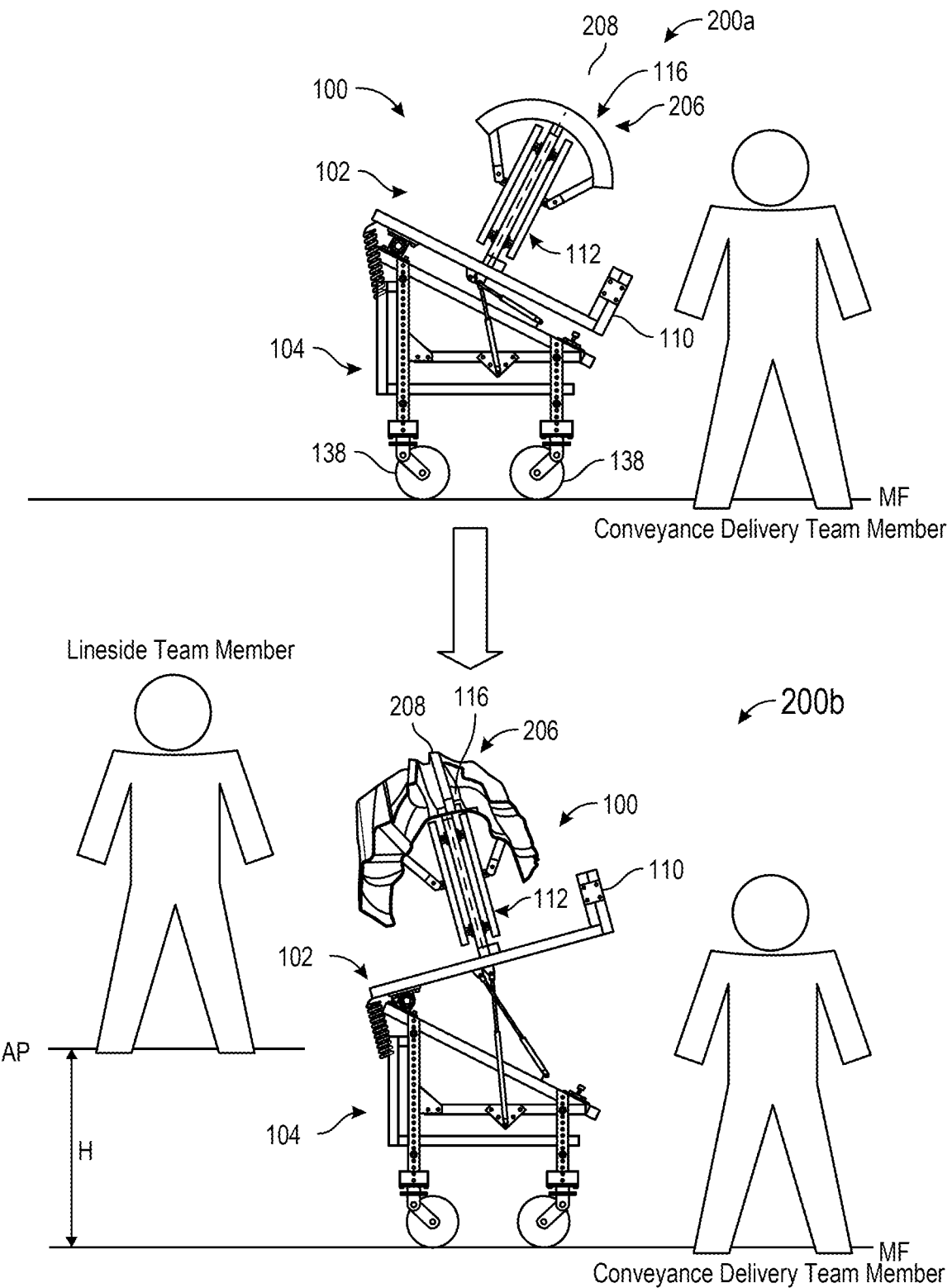
FIG. 2 depicts the dolly assembly of FIG. 1 utilized in delivering work parts to an assembly lineside team member according to an embodiment disclosed herein.

FIG. 2 depicts the dolly assembly 100 utilized in delivering work parts to an assembly lineside team member according to an embodiment disclosed herein. FIG. 2 illustrates a first operating environment 200a, in which the dolly assembly 100 is in the first configuration (e.g., a loading position as described in connection with FIG. 1B), and a second operating environment 200b, in which the dolly assembly 100 is in the second configuration (e.g., a pick-up position as described in connection with FIG. 1A).

With reference first to the environment 200a, one or more conveyance delivery team members can load one or more work parts 206 onto part-holding member 116 of the part-holding structure 112. The work parts 206 can be loaded right side up and one on top of the other, while the part-holding structure 112 provides uniform support so that the work parts do not deform or bend, as described above. In the illustrative example of FIG. 2, the work parts 206 are shown as fender liners, where right side up refers to an orientation that is substantially similar to the orientation the fender liner will be in upon installation on a vehicle. That is, for example, when installed on vehicle, the curvature apex 208 of the fender liner will be the vertically highest point of the fender liner. Thus, the fender lines held on the dolly assembly 100 are substantially upright because the curvature apex 208 are proximate to the fully up right position, as compared to an upside down orientation in which the curvature apex 208 could be the lowest vertical point of the fender liner (as shown in FIG. 4). Further, since the part-holding member 116 has a lower elevation in the first configuration as compared to the second configuration and is angled in a direction toward the conveyance team member, the work parts 206 can be loaded onto the part-holding member 116 without introducing poor ergonomic impacts on the conveyance member, as described above.

Figure 3A:
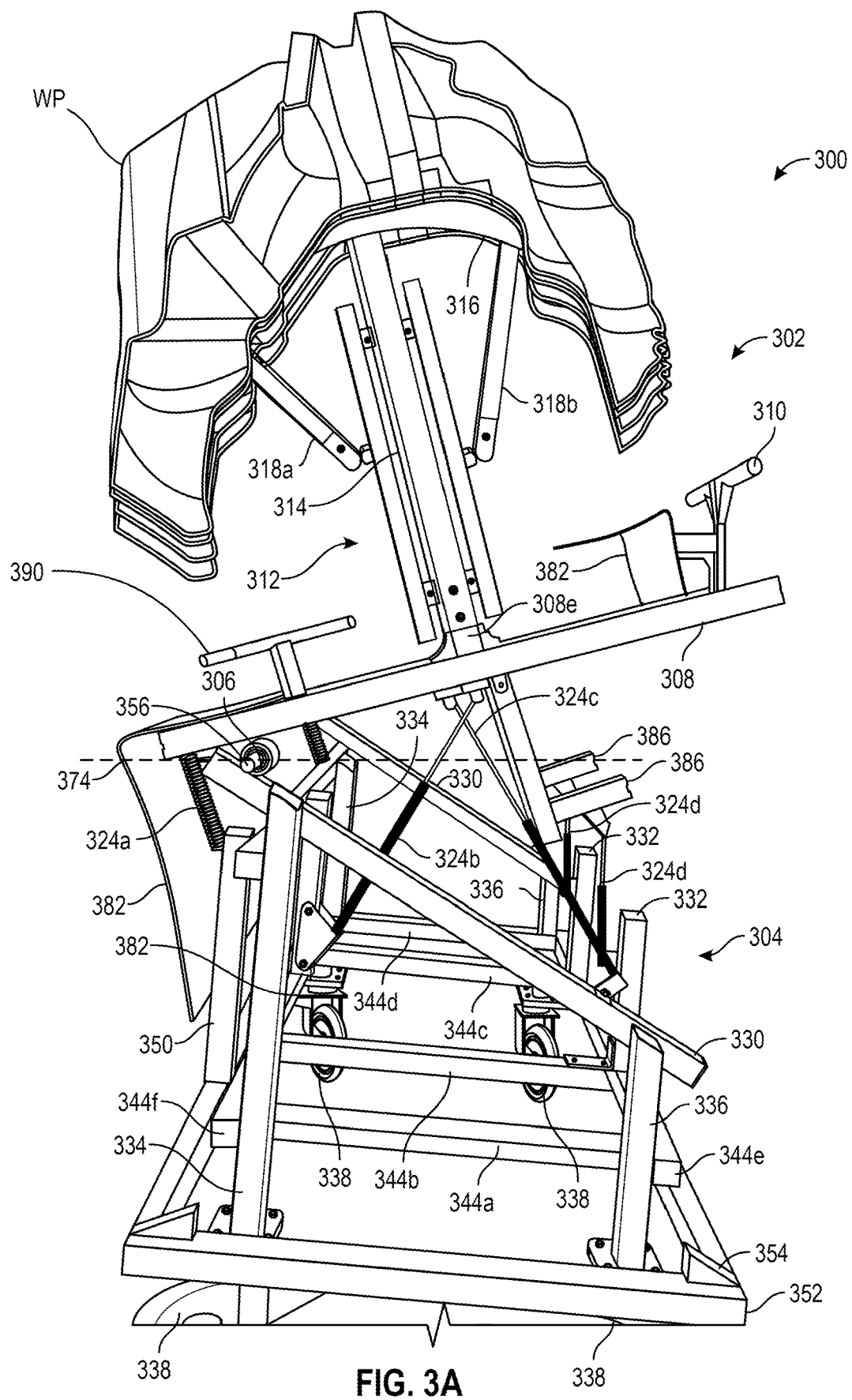
FIGS. 3A and 3B depict schematic views of another example dolly assembly in accordance with embodiments described herein.
Figure 3B:
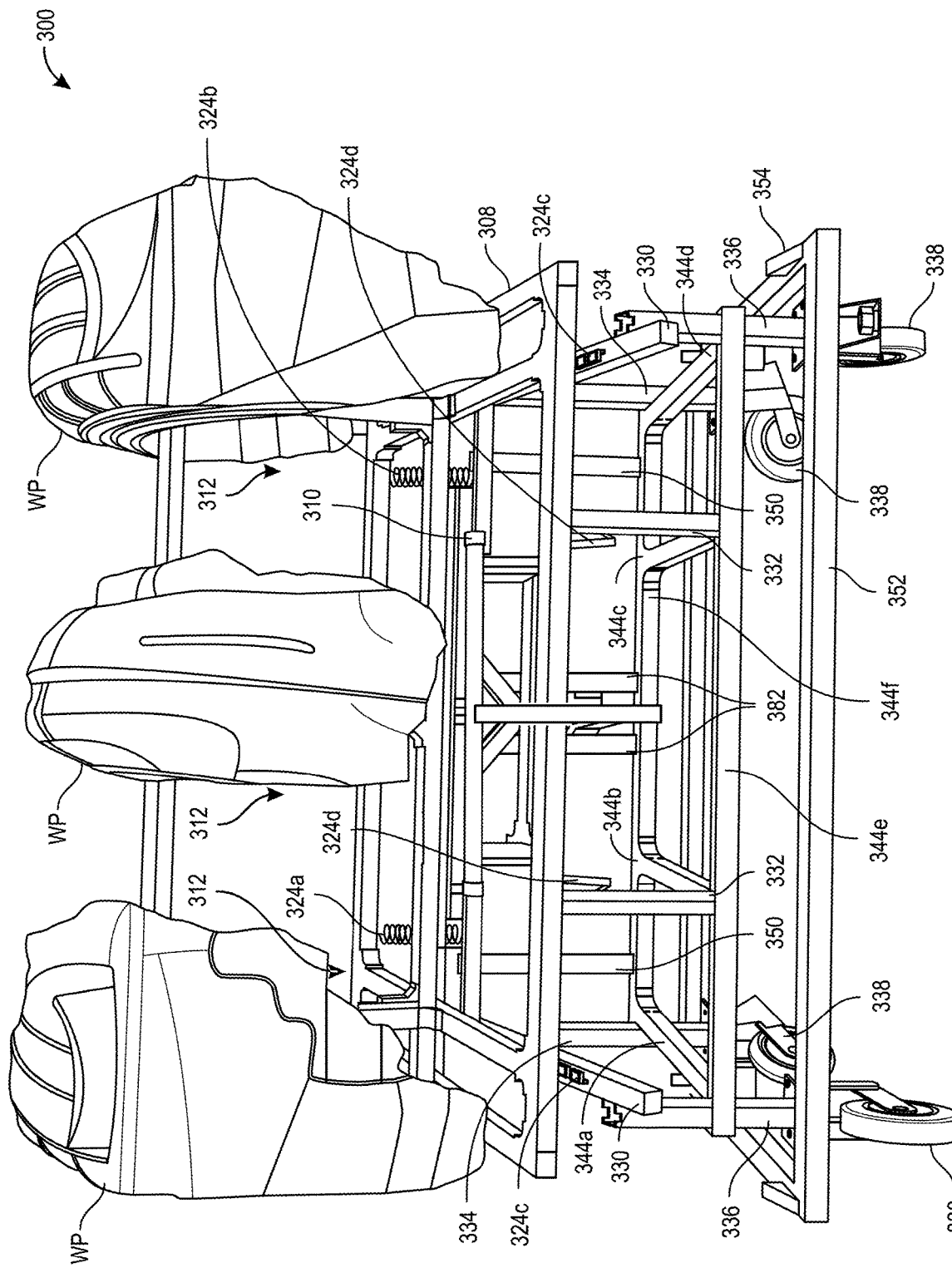

Once the work parts 206 are loaded onto the part staging assembly 102, the dolly assembly 100 can be moved about the manufacturing floor MF via mobility mechanism 138 so to deliver the work parts to an assembly lineside team member for installation. The conveyance delivery team member may utilize handle 110 and/or additional handles (such as shown in FIGS. 3A and 3B) to steer the dolly assembly 100 into position. The dolly assembly 100 may be in the first or second configuration during movement depending on whether or not the conveyance delivery team member operated the handle 110 to lift the part staging area into the pick-up position.

Operating environment 200b depicts a scenario where the dolly assembly 100 has been moved into position relative to assembly lineside team member and has been placed into the second configuration. As shown in FIG. 2, assembly lineside team member is on a lineside assembly platform AP (also referred to as a lift platform), which is at a height (H) above the manufacturing floor MF. In order place the dolly assembly 100 into the second configuration, the conveyance delivery team member operated handle 110 to lift the part staging assembly 102 into position, as described above. As a result, the elevation of the part-holding member 116 and the work parts 206 is raised relative to the elevation in the first configuration and angled toward the assembly lineside team member, which results in reduced effort and increased comfort for retrieving work parts 206 from the dolly assembly 100. For example, due to lifting the work parts 206 up and toward the lineside team member, ergonomic strains to the lineside team member are reduced (at least relative to conventional dollies), as described above. Furthermore, since the work parts 206 are carried and delivered in the substantially right side up orientation, the work parts 206 can be easily retrieved by lifting at edges of the work part proximate to the curvature apex 208, thereby reducing strains to the lineside team member as well. Furthermore, the work parts 206 are not deformed or damaged due to carrying and/or re-orientating the work parts 206 for installation.

FIGS. 3A and 3B depict schematic views of another example dolly assembly 300 in accordance with embodiments described herein. Dolly assembly 300 is substantially similar to dolly assembly 100, except as stated herein. Thus, reference numbers in FIGS. 3A and 3B refer to like reference numbers in FIGS. 1A and 1B. For example, dolly assembly 300 includes part staging assembly 302 and moveable base assembly 304, which are substantially the same as part staging assembly 102 and moveable base assembly 104, except as provided herein. Similar translation of a reference number from 1 ## to 3 ## is indicative of substantial similarity between the similarly referenced elements.

FIG. 3A depicts a schematic side view of the dolly assembly 300 in a second configuration (e.g., as similarly shown in FIG. 1A), where the part staging assembly 302 is lifted upwards and rotated about rotational axis 356 through rotation mechanism 306 at an angle above the transverse plane 374. The part staging assembly 302 also comprises a part-holding structure 312 positioned on part-carrying member 308. The part-holding structure 312 includes center support member 314, part-holding member 316, and end support members 318a and 318b. In the illustrative example of FIG. 3A, a work part WP has been placed on the part-holding member 316 (e.g., as described in connection with FIG. 2). A handle 310 is provided at a second end of the part-carrying member 308 and rotation mechanism 306 is attached proximate to a first end of the part-carrying member 308.

Lift and tilt mechanisms 324 are connected between the part-carrying member 308 and the moveable base assembly 304. For example, lift and tilt mechanism 324a is attached to a first end of the part-carrying member 308 and support beam 350, which is coupled to leg member 334. Lift and tilt members 324b and 324c are connected to part-carrying member 308 at position 308e (e.g., underside of the part-carrying member 308 opposite of the part-carrying structure 312). However, while lift and tilt mechanism 324c is connected to the support member 330 similarly as to lift and tilt mechanism 124c of FIG. 1A, lift and tilt mechanism 324b is connected to an interior support beam 384. Furthermore, dolly assembly 300 includes lift and tilt mechanism 324d connected to stopper 332 of the moveable base assembly 304 and a lift support arm 386 connected to the underside of the part-carrying member 308. Lift and tilt mechanism 324d may be substantially similar to lift and tilt mechanisms 324b and 324c.

FIG. 3B depicts dolly assembly 300 in a first configuration (e.g., as shown similarly in FIG. 1B) viewed from a direction of handle 310. The dolly assembly 300 may comprise a plurality of part-holding structures 312, shown in FIG. 3B as part-holding structures 312a-312c each having a work parts WP positioned thereon. Each part-holding structure 312 may be substantially similar to each other and to part-holding structure 112 of FIG. 1, while the work parts on each respective part-holding structure may be the same or different. In the example of FIG. 3B, work parts WP are illustrated as fender liners for three different vehicle models.

Furthermore, with reference to FIGS. 3A and 3B, cross beam 344 may be part of a support frame 388 having a plurality of cross beams 344a-f. Stopper 332 may be provided as a plurality of stoppers 332a and 332b attached support frame 388 on cross beam 344e. As shown in FIG. 3B, the part-carrying member 308 may rest on stoppers 332 in the second configuration. Additionally, a plurality of lift and tilt mechanism 324d are provided, each attached to a respective stopper 332. A plurality of support beams 350 are provided as support beams 350a-350d. In the example of FIG. 3B, two lift and tilt mechanism 324a are shown, each attached to a respective support beam 350a and 350d. In some embodiments, additional lift and tilt mechanisms 324a may be provided each attached to one or more of the remaining support beams 350c and 350b.

The support member 330 is illustratively shown as two support members on opposing sides of dolly assembly 300. Two lift and tilt mechanism 324c are shown, each attached to a respective support member 330. Thus, the example implementation of FIGS. 3A and 3B includes five lift and tilt mechanisms implemented as cylinders (or struts) and at least two lift and tilt mechanisms implemented as springs. The placement of lift and tilt mechanism 324b-324d may be selected to provide balanced weight ratio for the conveyance delivery team member during lifting of the part staging assembly 302.

Dolly assembly 300 also includes an additional handle 390 positioned on the portion carrying member 308 proximate to the rotation mechanism 306. Handle 390 may provide additional or alternative means to move the dolly assembly 300 about the manufacturing floor MF and/or assistance in lifting/lowering the part staging assembly 302.

Additionally, shields 380 and 382 can be optionally attached to the part-carrying member 308. Shield 380 can be attached at the first end of the part-carrying member 308 adjacent to the rotation mechanism 306 and extend downward in a direction toward the moveable base assembly 304. Shield 380 can provide protection to team members from lift and tilt mechanism 324a, Shield 382 can be attached to the second end of the part-carrying member 308, between the handle 310 and the part-carrying structure 312, and extending in a direction toward the part-holding member 316. Shield 382 can provide protection to team members from internals of the dolly assembly 300 while operating handle 310.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A dolly assembly, comprising:
   a base assembly comprising a support member and a mobility mechanism, the support member positioned obliquely with respect to a horizontal plane, wherein the support member comprises a rotation mechanism, wherein the rotation mechanism comprises a ball-bearing hinge; and a part-carrying member rotationally connected to a first end of the support member, the part-carrying member comprising a part-holding structure for receiving a work part, the part-carrying member extending downward from the first end of the support member at an angle below the horizontal plane when in a first configuration, and the part-carrying member extending upward from the first end of the support member at a first angle above the horizontal plane when in a second configuration.

2. The dolly assembly of claim 1, further comprising one or more lift and tilt mechanisms connected between the part-carrying member and the base assembly.

3. The dolly assembly of claim 2, wherein the one or more lift and tilt mechanisms comprises a spring connected between the first end of the support member and the part-carrying member.

4. The dolly assembly of claim 3, wherein in the first configuration, the spring is in a stretched state.

5. The dolly assembly of claim 2, wherein the one or more lift and tilt mechanisms comprises a one or more pneumatic struts attached to the part-carrying member.

6. The dolly assembly of claim 1, wherein the rotation mechanism is connected between the part-carrying member and the support member.

7. The dolly assembly of claim 1, wherein the support member extends downward from the first end of the support member at a second angle below the horizontal plane.

8. The dolly assembly of claim 1, wherein the support member extends from the part-carrying member in a direction away from the base assembly, wherein the part-holding member is located at an end opposite the part-carrying member.

9. The dolly assembly of claim 8, wherein
in the first configuration, the part-holding structure extends upward from the part-carrying member in a first direction away from the first end of the support member, and
in the second configuration, the part-holding structure extends upward from the part-carrying member in a second direction toward the first end of the support member.

10. The dolly assembly of claim 8, wherein the part-holding member comprises a pressure absorbing material.

11. A dolly assembly, comprising:
a base assembly comprising a support member and a mobility mechanism, the support member positioned obliquely with respect to a horizontal plane, wherein the support member comprises a rotation mechanism, wherein the rotation mechanism comprises a ball-bearing hinge;

a part-carrying member rotationally connected to a first end of the support member, the part-carrying member comprising a part-holding structure for receiving a work part, the part-carrying member extending downward from the first end of the support member at a first angle below the horizontal plane when in a first configuration; and one or more lift and tilt mechanisms connected between the part-carrying member and the base assembly.

12. The dolly assembly of claim 11, wherein the part-carrying member extends upward from the first end of the support member at an angle above the horizontal plane when in a second configuration.

13. The dolly assembly of claim 11, wherein the one or more lift and tilt mechanisms comprises a spring connected between the first end of the support member and the part-carrying member.

14. The dolly assembly of claim 13, wherein in the first configuration, the spring is in a stretched state.

15. The dolly assembly of claim 11, wherein the one or more lift and tilt mechanisms comprises a one or more pneumatic struts attached to the part-carrying member.

16. The dolly assembly of claim 11, wherein the rotation mechanism is connected between the part-carrying member and the support member.

17. The dolly assembly of claim 11, wherein the support member extends downward from the first end of the support member at a second angle below the horizontal plane.

18. The dolly assembly of claim 11, wherein the support member extends from the part-carrying member in a direction away from the base assembly, wherein the part-holding member is located at an end opposite the part-carrying member.

19. The dolly assembly of claim 18, wherein:
in the first configuration, the part-holding structure extends upward from the part-carrying member in a first direction away from the first end of the support member, and
in a second configuration, the part-holding structure extends upward from the part-carrying member in a second direction toward the first end of the support member.

20. The dolly assembly of claim 18, wherein the part-holding member comprises a pressure absorbing material.

* * * * *